(12) United States Patent
Nagaosa et al.

(10) Patent No.: US 11,626,610 B2
(45) Date of Patent: Apr. 11, 2023

(54) FUEL CELL STACK

(71) Applicant: TOYOTA JIDOSHA KABUSHIKI KAISHA, Toyota (JP)

(72) Inventors: Hideo Nagaosa, Susono (JP); Kota Manabe, Toyota (JP); Yoshihiro Shinozaki, Atsugi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 155 days.

(21) Appl. No.: 16/572,984

(22) Filed: Sep. 17, 2019

(65) Prior Publication Data
US 2020/0144656 A1 May 7, 2020

(30) Foreign Application Priority Data

Nov. 6, 2018 (JP) .............................. JP2018-209191

(51) Int. Cl.
*H01M 8/2485* (2016.01)
*H01M 8/249* (2016.01)
*H01M 8/04701* (2016.01)
*H01M 8/04029* (2016.01)
*H01M 8/0267* (2016.01)

(52) U.S. Cl.
CPC ....... *H01M 8/2485* (2013.01); *H01M 8/0267* (2013.01); *H01M 8/04029* (2013.01); *H01M 8/04701* (2013.01); *H01M 8/249* (2013.01)

(58) Field of Classification Search
CPC .................................................. H01M 8/2485
See application file for complete search history.

(56) References Cited

U.S. PATENT DOCUMENTS

| | | | | |
|---|---|---|---|---|
| 7,070,874 B2* | 7/2006 | Blanchet | ............. | H01M 8/2457 429/440 |
| 7,566,511 B2* | 7/2009 | Wariishi | ............ | H01M 8/04089 429/444 |
| 7,648,793 B2* | 1/2010 | Sato | .................. | H01M 8/04029 429/415 |
| 2019/0245236 A1* | 8/2019 | Taguchi | ................ | H01M 8/247 |

FOREIGN PATENT DOCUMENTS

| | | | | |
|---|---|---|---|---|
| EP | 1840994 A1 | * | 10/2007 | .......... H01M 8/0265 |
| JP | 4-248273 | | 9/1992 | |
| JP | 6-070162 | | 9/1994 | |
| JP | 6-275307 | | 9/1994 | |
| JP | 10-106610 A | | 4/1998 | |
| JP | 2005-166403 | | 6/2005 | |
| JP | 2010-241392 | | 10/2010 | |
| JP | 2011-051379 | | 3/2011 | |
| KR | 1020040003654 | * | 1/2004 | |
| KR | 1020040003654 A | * | 1/2004 | |

* cited by examiner

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

A fuel cell stack includes: a first stack including: first unit cells stacked; and a first outer peripheral surface around a first stacking direction of the first unit cells; a second stack that is juxtaposed to the first stack including; second unit cells stacked along the first stacking direction of the first unit cells; and a second outer peripheral surface around a second stacking direction of the second unit cells; an external gas manifold that supplies and discharges a reactant gas to and from the first and second stacks; and an external coolant manifold that supplies and discharges a coolant to and from the first and second stacks.

8 Claims, 11 Drawing Sheets

FUEL CELL STACK

CROSS-REFERENCE TO RELATED APPLICATION

This application is based upon and claims the benefit of priority of the prior Japanese Patent Application No. 2018-209191, filed on Nov. 6, 2018, the entire contents of which are incorporated herein by reference.

TECHNICAL FIELD

The present disclosure relates to a fuel cell stack.

BACKGROUND

In a fuel cell stack including a stack in which unit cells are stacked, internal manifolds for suppling and discharging an anode gas, a cathode gas, and a coolant are provided so as to penetrate the stack in a stacking direction of the stack (See, for example, Japanese Unexamined Patent Application Publication No. 2010-241392).

Herein, a reduction in size in the stacking direction might be desired in light of the space for mounting the fuel cell stack. The reduction in size in the stacking direction is achieved by reducing the number of the unit cells. However, the reduction in the number of the unit cells reduces the output power of the fuel cell stack. Further, the internal manifold is formed to penetrate the stack in the stacking direction, and pipes are connected to the internal manifold of the stack in the stacking direction. This might make it difficult to reduce the size of the stack in the stacking direction.

SUMMARY

It is an object of the present disclosure to provide a fuel cell stack that reduces its size in a stacking direction of unit cells, while ensuring its output power.

The above object is achieved by a fuel cell stack including: a first stack including: first unit cells stacked; and a first outer peripheral surface around a first stacking direction of the first unit cells; a second stack that is juxtaposed to the first stack including; second unit cells stacked along the first stacking direction of the first unit cells; and a second outer peripheral surface around a second stacking direction of the second unit cells; an external gas manifold that supplies and discharges a reactant gas to and from the first and second stacks; and an external coolant manifold that supplies and discharges a coolant to and from the first and second stacks, wherein the external gas manifold and the external coolant manifold are connected to at least a part of the first outer peripheral surface and at least a part of the second outer peripheral surface, and extend along a crossing direction crossing the first stacking direction.

The first and second stacks are juxtaposed to each other as described above, thereby reducing the size in the stacking direction while ensuring the total number of the first and second unit cells and the output power of the fuel cell stack. Further, the external gas manifold and the external coolant manifold are connected to at least a part of the first and second outer peripheral surfaces, and extend along a cross direction crossing the stacking direction. This avoids the arrangement of the external gas manifold and the external coolant manifold extending in the stacking direction, so that the fuel cell stack reduces its size in the stacking direction.

The external gas manifold may include first and second external gas manifolds that sandwich the first and second stacks in a direction crossing the first stacking direction and a direction in which the first and second stacks are juxtaposed to each other.

The external coolant manifold may include: a coolant supply portion that supplies the coolant to one of the first and second stacks; and a coolant discharge portion that discharges the coolant from the other of the first and second stacks, and the coolant supply portion and the coolant discharge portion may sandwich the first and second stacks in a direction in which the first and second stacks are juxtaposed to each other.

The first and second outer peripheral surfaces may respectively include first and second facing regions that face each other, the external gas manifold and the external coolant manifold may be connected to at least other regions of the first and second outer peripheral surfaces other than the first and second facing regions, the fuel cell stack may include a coolant guide member, and the coolant guide member may electrically insulate the first and second facing regions from each other, may connect the first and second facing regions to each other, and may guide the coolant discharged from one of the first and second stacks to the other of the first and second stacks.

The first and second stacks may respectively include first and second coolant flow grooves through which the coolant flows, and the first and second coolant flow grooves may extend in a direction in which the first and second stacks are juxtaposed to each other.

The external gas manifold may include a reactant gas guide portion that guides the reactant gas discharged from one of the first and second stacks to the other of the first and second stacks.

The reactant gas guide portion may cause the reactant gas discharged from outlets of reactant gas flow grooves provided in the one of the first and second stacks to flow into each other, and may guide the reactant gas to inlets of reactant gas flow grooves provided in the other of the first and second stacks.

The reactant gas may include an anode gas and a cathode gas, the external gas manifold may include an anode gas passage portion and a cathode gas passage portion through which the anode gas and the cathode gas flow, respectively, and the anode gas passage portion and the cathode gas passage portion may be provided in a single member and may be separated from each other.

The anode gas passage portion may supply the anode gas to one of the first and second stacks located on an upstream side of the anode gas, the external gas manifold may include a heat transfer portion, and the heat transfer portion may promote heat exchange between the anode gas flowing through the anode gas passage portion and the cathode gas flowing through the cathode gas passage portion.

The cathode gas passage portion may supply the cathode gas to one of the first and second stacks located on an upstream side of the cathode gas, the external gas manifold may include a heat transfer portion, and the heat transfer portion may promote heat exchange between the cathode gas flowing through the cathode gas passage portion and the anode gas flowing through the anode gas passage portion.

The first and second unit cells, adjacent to each other in a direction in which the first and second stacks are juxtaposed to each other, may include a common electrolyte membrane.

The first unit cell may include a first anode catalyst layer and a first cathode catalyst layer, the second unit cell may include a second anode catalyst layer and a second cathode catalyst layer, the first anode catalyst layer and the second cathode catalyst layer may be spaced apart from each other, and may be provided on one surface of the common electrolyte membrane, and the second anode catalyst layer and the first cathode catalyst layer may be spaced apart from each other, and may be provided on the other surface of the common electrolyte membrane.

The crossing direction may be a direction in which the first and second stacks are juxtaposed to each other.

DETAILED DESCRIPTION

Figure 1:
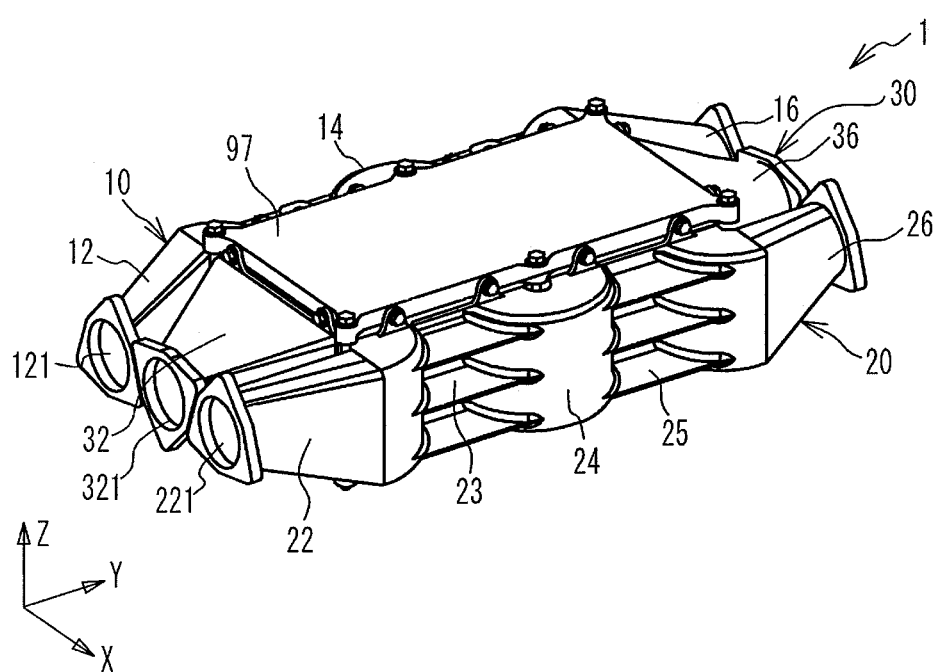
FIG. 1 is an external perspective view of a fuel cell stack.
Figure 2:
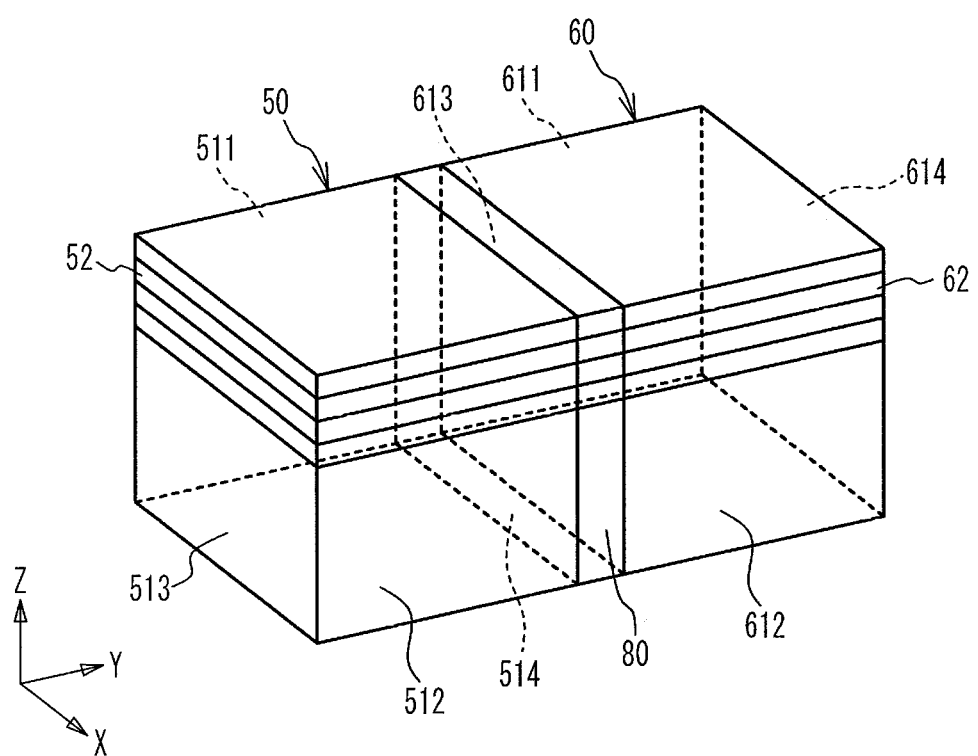
FIG. 2 is an external perspective view of two stacks provided in the fuel cell stack.

FIG. 1 is an external perspective view of a fuel cell stack 1. The fuel cell stack 1 is mounted on a vehicle. The vehicle is a fuel cell vehicle, an electric vehicle, a hybrid vehicle or the like, but not limited thereto, and is applicable to various moving bodies other than the vehicle (for example, ships, airplanes, robots, etc.) and stationary power sources. The fuel cell stack 1 includes manifolds 10, 20, and 30. FIG. 2 is an external perspective view of two stacks 50 and 60 provided in the fuel cell stack 1. Unlike internal manifolds formed inside the stacks 50 and 60, the manifolds 10, 20, and 30 are external manifolds arranged around the stacks 50 and 60. FIGS. 1 and 2 illustrate an X direction, a Y direction, and a Z direction that are orthogonal to one another.

[Schematic Configuration of Stacks 50 and 60]

As illustrated in FIG. 2, the stacks 50 and 60 are juxtaposed to each other in the Y direction. That is, the Y direction indicates the direction in which the stacks 50 and 60 are juxtaposed to each other. The stacks 50 and 60 are each substantially in the form of a rectangular parallelepiped, and have substantially the same shape and size. The stack 50 includes unit cells 52 stacked in the Z direction. Likewise, the stack 60 includes unit cells 62 stacked in the Z direction. That is, the Z direction is the stacking direction of the unit cells 52 and also the stacking direction of the unit cells 62. The unit cells 52 and 62 are supplied with an anode gas (for example, hydrogen) and a cathode gas (for example, air) as reactant gases to generate electric power. In a present embodiment, the fuel cell stack 1 is used in a posture in which the Z direction is along the gravity direction, but not limited thereto.

The stack 50 includes side surfaces 511 to 514 which are an outer peripheral surface around the Z direction. The side surfaces 511 and 512 are substantially parallel to a YZ plane and are apart from each other in the X direction. The side surfaces 513 and 514 are substantially parallel to an XZ plane and are apart from each other in the Y direction. Likewise, the stack 60 includes side surfaces 611 to 614 which are an outer peripheral surface around the Z direction. The side surfaces 611 and 612 are substantially parallel to the YZ plane and are apart from each other in the X direction. The side surfaces 613 and 614 are substantially parallel to the XZ plane and are apart from each other in the Y direction. In the stacks 50 and 60, the side surfaces 514 and 613 face each other through coolant guide members 80 described later. The side surfaces 514 and 613 are examples of first and second facing regions facing each other.

In such a manner, the stacks 50 and 60 are juxtaposed to each other in the Y direction such that the stacking direction of the unit cells 52 and the stacking direction of the unit cells 62 are parallel to the Z direction. This reduces the whole size of the stacks 50 and 60 in the Z direction, as compared with a case of stacking the total number of the unit cells 52 and 62 in the Z direction as a single stack. Further, the total number of the unit cells 52 and 62 is ensured, so that the total output power of the stacks 50 and 60 is also ensured.

[Schematic Configuration of Manifolds 10, 20, and 30]

Figure 3:
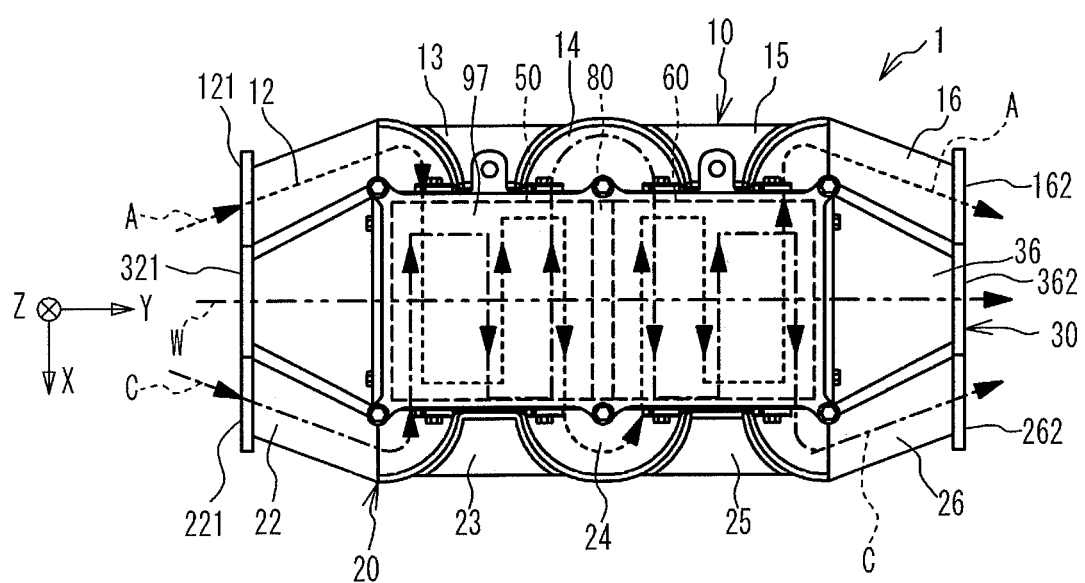
FIG. 3 is a view of the fuel cell stack when viewed in a −Z direction.
Figure 4:
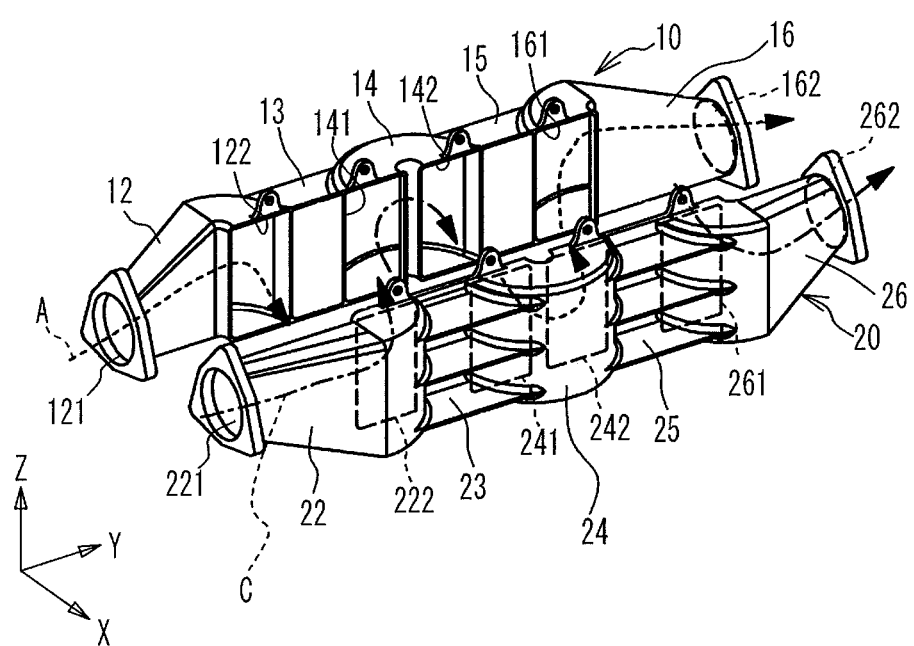
FIG. 4 is an external perspective view illustrating only manifolds in which an anode gas and a cathode gas flow.

FIG. 3 is a view of the fuel cell stack 1 when viewed in the −Z direction. In FIG. 3, the directions in which the anode gas, the cathode gas, and the coolant flow are indicated by dotted arrows A, dashed dotted arrows C, and long dashed double-short dashed arrows W, respectively. In the present embodiment, the coolant is cooling water, but the coolant is not limited to such a liquid, and may be a gas. FIG. 4 is an external perspective view illustrating only the manifolds 10 and 20 in which the anode gas and the cathode gas flow.

The manifold 10 extends along the Y direction, and is connected to the side surface 511 of the stack 50 and the side surface 611 of the stack 60. The manifold 10 includes a supply portion 12, a guide portion 14, and a discharge portion 16 that are arranged in this order in the +Y direction. An introduction port 121 is formed at an end of the supply portion 12. The introduction port 121 is connected to a pipe for supplying the anode gas from a fuel tank to the stacks 50 and 60. A discharge port 162 is formed at an end of the discharge portion 16. The exhaust port 162 is connected to a pipe to which the anode gas is discharged from the stacks 50 and 60.

The manifold 20 extends along the Y direction, and is connected to the side surface 512 of the stack 50 and the side surface 612 of the stack 60. The manifold 20 includes a supply portion 22, a guide portion 24, and a discharge portion 26 that are arranged in this order in the +Y direction. An introduction port 221 is formed at an end of the supply portion 22. The introduction port 221 is connected to a pipe for supplying the cathode gas pressure-fed by an air compressor to the stacks 50 and 60. A discharge port 262 is formed at an end of the discharge portion 26. The discharge port 262 is connected to a pipe to which the cathode gas is discharged from the stacks 50 and 60.

The manifold 30 extends in the Y direction, and includes a supply portion 32, connected to the side surface 513 of the stack 50, and a discharge portion 36, connected to the side surface 614 of the stack 60. An introduction port 321 is formed at an end of the supply portion 32. The introduction port 321 is connected to a pipe for supplying the coolant to the manifold 30. A discharge port 362 is formed at an end of the discharge portion 36. The discharge port 362 is connected to a pipe for supplying the coolant discharged from the stacks 50 and 60 to a radiator.

In the present embodiment, as illustrated in FIGS. 3 and 4, the anode gas is supplied from the supply portion 12 to the stack 50, and the anode gas discharged from the stack 50 is supplied to the stack 60 through the guide portion 24 of the manifold 20. The anode gas discharged from the stack 60 is discharged to the discharge portion 16 of the manifold 10. The supply portion 12 and the discharge portion 16 are examples of an anode gas passage portion formed in the manifold 10 through which the anode gas flows. Further, the guide portion 24 is an example of an anode gas passage portion formed in the manifold 20 through which the anode gas flows. Also, the guide portion 24 is an example of a reactant gas guide portion for guiding the anode gas discharged from the stack 50 to the stack 60.

On the other hand, the cathode gas is supplied from the supply portion 22 to the stack 50, and the cathode gas discharged from the stack 50 is supplied to the stack 60 through the guide portion 14 of the manifold 10. The cathode gas discharged from the stack 60 is discharged to the discharge portion 26 of the manifold 20. The supply portion 22 and the discharge portion 26 are examples of a cathode gas passage portion formed in the manifold 20 through which a cathode gas flows. Further, the guide portion 14 is an example of a cathode gas passage portion formed in the manifold 10 through which the cathode gas flows. Also, the guide portion 14 is an example of a reactant gas guide portion for guiding the cathode gas discharged from the stack 50 to the stack 60.

The coolant is supplied from the supply portion 32 to the stack 50, and the coolant discharged from the stack 50 is supplied to the stack 60. The coolant discharged from the stack 60 is discharged to the discharge portion 36. As described above, the reactant gas is supplied to the stacks 50 and 60 to generate a power generation reaction, and the coolant suppresses the stacks 50 and 60 from being heated.

The manifolds 10, 20, and 30 extend in a direction crossing the Z direction, specifically, in the Y direction as described above. Therefore, the fuel cell stack 1 reduces its size in the Z direction, as compared with a case where such manifolds extend in the Z direction. Further, the sizes of the stacks 50 and 60 are reduced in the Z direction by being juxtaposed to each other in the Y direction as described above and the manifolds 10, 20, and 30 extend along the Y direction, whereby the fuel cell stack 1 further reduces its size in the Z direction. Therefore, for example, even in a case of installing the fuel cell stack 1 in a narrow space in a gravity direction such as under a vehicle floor, it is easy to install the fuel cell stack 1 in such space by matching the gravity direction with the Z direction of the fuel cell stack 1. Additionally, it is easy to manufacture a fuel cell vehicle equipped with the fuel cell stack 1 by using a vehicle body for an electric vehicle in which a battery pack is installed under the vehicle floor.

Herein, the manifolds 10, 20, and 30 are fixed to end plates 97 and 98, clamping the stacks 50 and 60 in the Z direction and described later in detail, by fixing members such as screws and bolts. The manifolds 10, 20, and 30 are arranged so as not to intersect virtual planes parallel to the end plates 97 and 98 spaced away from each other in the Z direction, in other words, arranged between these virtual planes. Even with such a configuration, the fuel cell stack 1 reduces its size in the Z direction.

As described above, the manifolds 10, 20, and 30 extend along the Y direction in which stacks 50 and 60 are juxtaposed to each other. Specifically, each longitudinal direction of the manifolds 10 and 20 is the Y direction, and the supply portion 32 and the discharge portion 36 of the manifold 30 are arranged to sandwich the stacks 50 and 60 in the Y direction. Therefore, the fuel cell stack 1 also reduces its size in the X direction. For example, in a case of installing the fuel cell stacks 1 in a narrow space such as under the vehicle floor, it is possible to install more fuel cell stacks 1 by arranging the fuel cell stacks 1 adjacent to each other in the X direction.

As illustrated in FIGS. 1 and 3, the supply portions 12, 22, and 32 and the discharge portions 16, 26, and 36 to which the pipes are respectively connected extend from the stacks 50 and 60 along the Y direction, not the Z direction. Further, axial directions of the introduction ports 121, 221, and 321 and the discharge ports 162, 262, and 362 are substantially parallel to the Y direction. For this reason, even when the pipes are connected to these ports, these pipes are prevented from overlapping the stacks 50 and 60 in the Z direction. This makes it easy to install the fuel cell stack 1 in a narrow space such as under the vehicle floor.

Further, the manifolds 10 and 20 sandwich the stacks 50 and 60 in the X direction, thereby suppressing the positional displacement of the unit cells 52 and 62 in the X direction. The manifolds 10 and 20 are respectively an example of first and second external gas manifolds that sandwich the stacks 50 and 60 in the X direction, which is a direction crossing the Z direction and the Y direction. Furthermore, the supply portion 32 and the discharge portion 36 of the manifold 30 sandwich the stacks 50 and 60 in the Y direction, thereby suppressing the positional displacement of the unit cells 52 and 62 in the Y direction. As described above, the positional displacement of the unit cells 52 and 62 in the X direction and the Y direction is suppressed by manifolds 10, 20, and 30 that supply and discharge the reactant gas and the coolant to and from the stacks 50 and 60. This eliminates the need for special parts for suppressing the positional displacement, and the number of parts is reduced.

[Detailed Configuration of Manifold 10]

As illustrated in FIG. 4, a supply port 122 having a substantially rectangular shape and connected to a part of the side surface 511 of the stack 50 is formed at the proximal end of the supply portion 12. The supply portion 12 includes a cylindrical portion and a fan columnar portion. In the cylindrical portion, the flow passage cross-sectional area gradually increases as it approaches the stack 50 from the introduction port 121. The fan columnar portion includes an opening communicated with the cylindrical portion, and the supply port 122 connected to the side surface 511 of the stack 50. The fan columnar portion defines fan columnar inner space. The flow passage cross-sectional area in the fan columnar portion is larger than that in the cylindrical portion.

The guide portion 14 defines a substantially semicylinder inner space for guiding the cathode gas discharged from the stack 50 to the stack 60. A guide inlet 141 having a substantially rectangular shape and connected to the side surface 511 of the stack 50 is formed at an end of the guide portion 14. A guide outlet 142 having a substantially rectangular shape and connected to the side surface 611 of the stack 60 is formed at the other end of the guide portion 14.

The shape of the discharge portion 16 is similar to the shape of the supply portion 12, and is substantially symmetrical to the shape of the supply portion 12 with respect to the XZ plane. A discharge outlet 161 having a substantially rectangular shape and connected to a part of the side surface 611 of the stack 60 is formed at the proximal end of the discharge portion 16. Additionally, each edge of the supply port 122, the guide inlet 141, the guide outlet 142, and the discharge outlet 161 is provided with a seal member having insulation and elasticity for preventing leakage of the reactant gas.

[Detailed Configuration of Manifold 20]

The shape of the manifold 20 is similar to the shape of the manifold 10, and is substantially symmetrical to the shape of the manifold 10 with respect to the YZ plane. The supply portion 22 supplies the cathode gas to the stack 50. The shape of the supply portion 22 is substantially the same as the shape of the discharge portion 16. A supply port 222 connected to the side surface 512 of the stack 50 is formed at the proximal end of the supply portion 22.

The guide portion 24 defines a substantially semicylindrical inner space for guiding the anode gas discharged from the stack 50 to the stack 60. A guide inlet 241 having a substantially rectangular shape and connected to the side surface 512 of the stack 50 is formed at an end of the guide portion 24. An guide outlet 242 having a substantially rectangular shape and connected to the side surface 612 of the stack 60 is formed at the other end of the guide portion 24.

The discharge portion 26 discharges the cathode gas from the stack 60. The shape of discharge portion 26 is similar to the shape of the supply portion 22, is substantially symmetrical to the shape of supply portion 12 in the XZ plane, and is substantially the same as the shape of the supply portion 12. A discharge outlet 261 having a substantially rectangular shape and connected to a part of the side surface 612 of the stack 60 is formed at the proximal end of the discharge portion 26. The seal member described above is provided at each edge of the supply port 222, the guide inlet 241, the guide outlet 242, and the discharge outlet 261.

[Detailed Configuration of Manifold 30]

The supply portion 32 supplies the coolant to the stack 50. The supply portion 32 has a substantially tapered cylindrical shape whose cross-sectional area increases as it approaches the stack 50. A supply port connected to the side surface 513 of the stack 50 is formed at the proximal end of the supply portion 32. In the discharge portion 36, the coolant is discharged from the stack 60. The shape of the discharge portion 36 is similar to the shape of the supply portion 32, and is substantially symmetrical to the shape of supply portion 32 with respect to the XZ plane. A discharge port connected to the side surface 614 of the stack 60 is formed at the proximal end of the discharge portion 36. The above-described seal member is provided at each edge of the supply port of the supply portion 32 connected to the stack 50 and the discharge port of the discharge portion 36 connected to the stack 60.

All of the anode gas and the cathode gas discharged from the stack 50 are supplied to the stack 60 through the guide portions 24 and 14, respectively. Herein, for example, in a case where the cathode gas or the anode gas is distributed to the stacks 50 and 60 and is simultaneously supplied thereto, measures to suppress the distribution ratio deviation might be needed. The present embodiment eliminates such measures, and simplifies the structure of the fuel cell stack 1.

As illustrated in FIGS. 1 and 4, three heat transfer fins 23 arranged in the Z direction are provided between the supply portion 22 and the guide portion 24. Likewise, heat transfer fins 25 are provided between the guide portion 24 and the discharge portion 26. As illustrated in FIGS. 3 and 4, heat transfer fins 13 are also provided between the supply portion 12 and the guide portion 14. Likewise, heat transfer fins 15 are provided between the guide portion 14 and the discharge portion 16. Such heat transfer fins 23, 25, 13, and 15 promote heat dissipation from the stacks 50 and 60.

Herein, as described above, the anode gas to be supplied to the stack 50 flows to the supply portion 12 of the manifold 10, and the cathode gas discharged from the stack 50 flows to the guide portion 14 of the manifold 10. Herein, the supply portion 12 and the guide portion 14 are provided in the same manifold 10 and further thermally connected to each other by the heat transfer fins 13 described above. This promotes the heat exchange between the anode gas flowing through the supply portion 12 and the cathode gas flowing through the guide portion 14.

Herein, generally, the temperature of the anode gas flowing through the supply portion 12 is low. This is because the anode gas is stored at high pressure in the fuel tank, and then adiabatically expands when the anode gas is supplied to the stack 50. The temperature of the anode gas is lower at the cold start. For this reason, the anode gas may be supplied to the stack 50 at a temperature lower than the temperature suitable for the power generation. Additionally, the cathode gas discharged from the stack 50 and flowing through the guide portion 14 is heated to expand its volume, by receiving the heat associated with the power generation reaction of the stack 50. This might reduce the supply amount of the cathode gas to the stack 60. The present embodiment promotes the heat exchange between the low temperature anode gas and the high temperature cathode gas. Therefore, the temperature of the anode gas supplied to the stack 50 increases to improve the power generation efficiency of the stack 50, and the temperature of the cathode gas supplied to the stack 60 also decreases to improve the power generation efficiency of the stack 60.

Further, in the manifold 10, the supply portion 12 and the discharge portion 16, through which the anode gas flows, are separated from the guide portion 14, through which the cathode gas unlike the anode gas flows. As compared with a case where these are separately connected to the stacks 50 and 60, the workability of the connection to the stacks 50 and 60 is improved. Likewise, in the manifold 20, the guide portion 24, through which the anode gas flows, is separated from the supply portion 22 and the discharge portion 26, through which the cathode gas flows.

[Detailed Configuration of Stacks 50 and 60]

Figure 5:
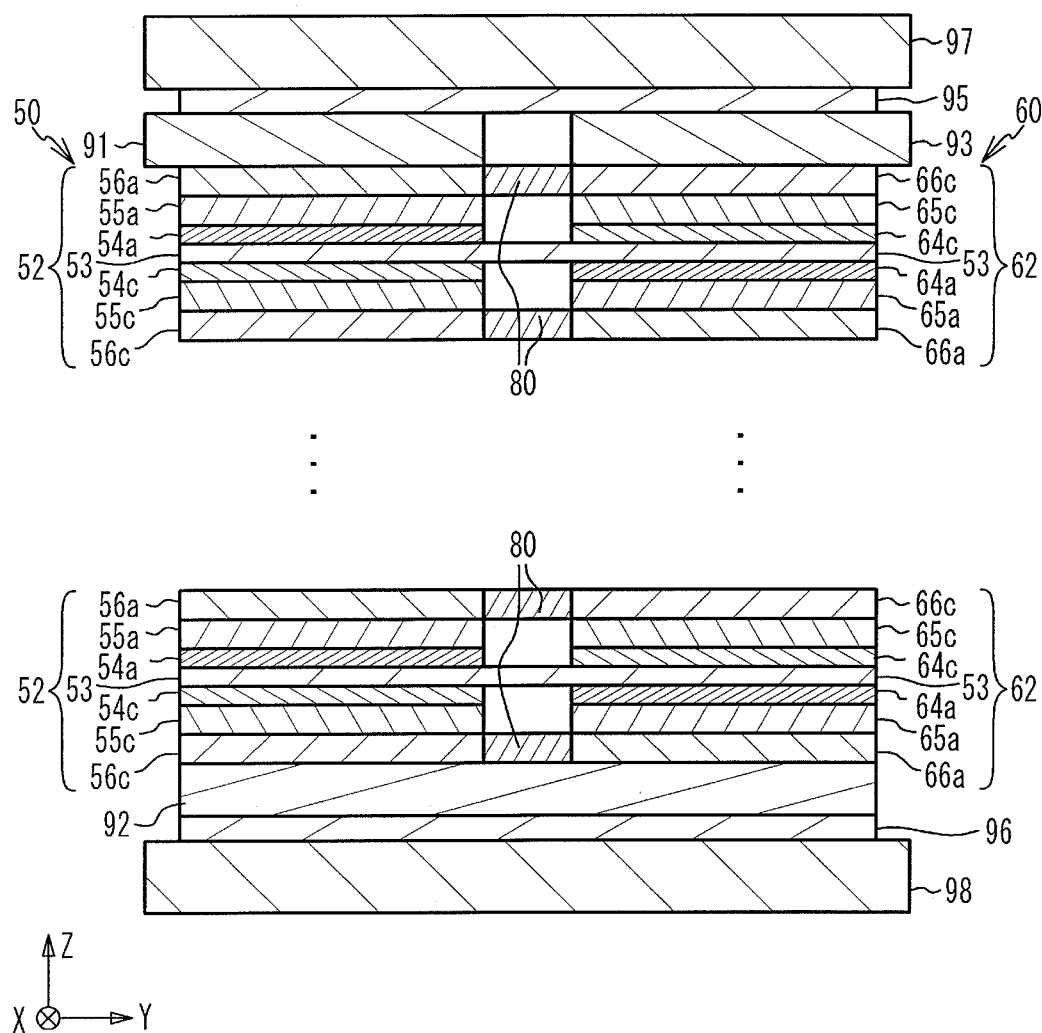
FIG. 5 is a cross-sectional view of the stacks juxtaposed to each other.

FIG. 5 is a cross-sectional view of the stacks 50 and 60 juxtaposed to each other. The unit cell 52 includes an electrolyte membrane 53, an anode catalyst layer 54a, an anode diffusion layer 55a, an anode separator 56a, a cathode catalyst layer 54c, a cathode diffusion layer 55c, and a cathode separator 56c. The anode catalyst layer 54a and the cathode catalyst layer 54c are respectively formed on a side and the other side of the electrolyte membrane 53. Details of the electrolyte membrane 53 will be described later. The anode diffusion layer 55a and the cathode diffusion layer 55c are joined to the anode catalyst layer 54a and the cathode catalyst layer 54c, respectively. The anode separator 56a and the cathode separator 56c are joined to the anode diffusion layer 55a and the cathode diffusion layer 55c, respectively.

A terminal plate 91 having conductivity is disposed at the end of the unit cells 52 in the +Z direction. A terminal plate 93 having conductivity is disposed at the end of the unit cell 62 in the +Z direction. An intermediate plate 92 having conductivity is disposed at the end of the unit cell 52 in the −Z direction and at the end of the unit cell 62 in the −Z direction. The terminal plates 91 and 93 have substantially the same size. The intermediate plate 92 is larger than each of the terminal plates 91 and 93. An insulator 95 for insulating the terminal plates 91 and 93, and the end plate 97 from each other is disposed therebetween. Likewise, an insulator 96 is disposed between the intermediate plate 92 and the end plate 98.

The unit cell 52 in which the anode separator 56a is conductively connected to the terminal plate 91 is conductively connected to the anode separator 56a of the unit cell 52 (not illustrated) adjacent to the above unit cell 52. The unit cell 52 in which the cathode separator 56c is conductively connected to the intermediate plate 92 is conductively connected to the cathode separator 56c (not illustrated) adjacent to the above unit cell 52. Thus, the unit cells 52 are electrically connected in series between the terminal plate 91 and the intermediate plate 92.

Likewise, the stack 60 includes the electrolyte membrane 53, an anode catalyst layer 64a, an anode diffusion layer 65a, an anode separator 66a, a cathode catalyst layer 64c, a cathode diffusion layer 65c, and a cathode separator 66c. The unit cell 62 in which the cathode separator 66c is conductively connected to the terminal plate 93 is conductively connected to the cathode separator 66c (not illustrated) adjacent to the above unit cell 62. The unit cell 62 in which the anode separator 66a is conductively connected to the intermediate plate 92 is conductively connected to the anode separator 66a (not illustrated) adjacent to the above unit cell 62. Thus, the unit cells 62 are electrically connected in series between the intermediate plate 92 and the terminal plate 93. Accordingly, the unit cells 52 and the unit cells 62 are electrically connected in series between the terminal plates 91 and 93 via the intermediate plate 92.

The unit cells 52 and 62 shares the electrolyte membrane 53. Specifically, the anode catalyst layer 54a and the cathode catalyst layer 64c spaced apart from each other in the Y direction are formed on a surface, in the +Z direction side, of the electrolyte membrane 53. The cathode catalyst layer 54c and the anode catalyst layer 64a spaced apart from each other in the Y direction are formed on the other surface, in the −Z direction side, of the electrolyte membrane 53. Therefore, the electrolyte membrane 53 has a substantially rectangular shape. A longitudinal length of the electrolyte membrane 53 is substantially the same as the total length of the length of the unit cells 52 and 62 in the Y direction and the length of the coolant guide member 80 in the Y direction. A short length of the electrolyte membrane 53 is substantially the same as each of the unit cells 52 and 62 in the X direction.

Since the unit cells 52 and 62 share the electrolyte membrane 53 as described above, it is easy to manufacture the unit cells 52 and 62 in an integral manner. Herein, in general, an electrolyte membrane in which the catalyst layer is formed on each surface is manufactured as follows. On both surfaces of a long electrolyte membrane sheet, catalyst layers are intermittently formed at predetermined intervals in the longitudinal direction of the electrolyte membrane sheet by transcription or the like. After that, the electrolyte membrane sheet is divided into each catalyst layer, thereby manufacturing the electrolyte membrane having the catalyst layer formed on each surface. In the present embodiment, the electrolyte membrane sheet on which the catalyst layers are intermittently formed on each surface is divided into each of the two catalyst layers adjacent to each other on the surface, thereby manufacturing the above-described electrolyte membrane 53. In this manner, the electrolyte membrane 53 can be easily manufactured only by changing the dividing position of the electrolyte membrane sheet. Also, an increase in manufacturing cost is suppressed.

Further, in general, the amount of generated water generated by the power generation reaction is larger on the cathode side than on the anode side. For this reason, the electrolyte membrane may be partially dried on the anode side. In the electrolyte membrane 53 in the present embodiment, the cathode catalyst layer 64c and the anode catalyst layer 54a are adjacent to each other on the same surface. Thus, a part of the generated water generated on the cathode catalyst layer 64c moves within the electrolyte membrane 53 in the −Y direction, and permeates the anode catalyst layer 54a. Likewise, a part of the generated water generated on the cathode catalyst layer 54c moves with in the electrolyte membrane 53 in the +Y direction, and permeates the anode catalyst layer 64a. This suppresses the electrolyte membrane 53 on the sides of the anode catalyst layer 54a and the anode catalyst layer 64a from being dried, whereby the power generation efficiency of the unit cells 52 and 62 is improved.

The anode separator 56a and the cathode separator 66c adjacent to each other in the Y direction are connected through the coolant guide member 80. The same applies to the cathode separator 56c and the anode separator 66a adjacent to each other in the Y direction. Herein, the coolant guide member 80 is made of rubber having insulation and elasticity. Therefore, the coolant guide member 80 prevents the contact between the unit cells 52 and 62 adjacent to each other in the Y direction, and prevents the short circuit. Further, the coolant guide member 80 is elastically deformable, it is possible to absorb the positional displacement of the separators to which the coolant guide member 80 is connected and variation in dimension of each member. Moreover, the stacks 50 and 60 are closely arranged while preventing such a short circuit. This suppresses an increase in size of the fuel cell stack 1 in the Y direction.

Accordingly, the unit cells 52 and 62 adjacent to each other in the Y direction are integrated by the electrolyte membrane 53 and the coolant guide member 80. The unit cells 52 and 62 ensure a contact area with the other unit cells 52 and 62 stacked in the Z direction, thereby increasing the frictional resistance and preventing the positional displacement in the XY planar direction.

[Detailed Configuration of Anode Separator 56a and Cathode Separator 66c]

Figure 6A:
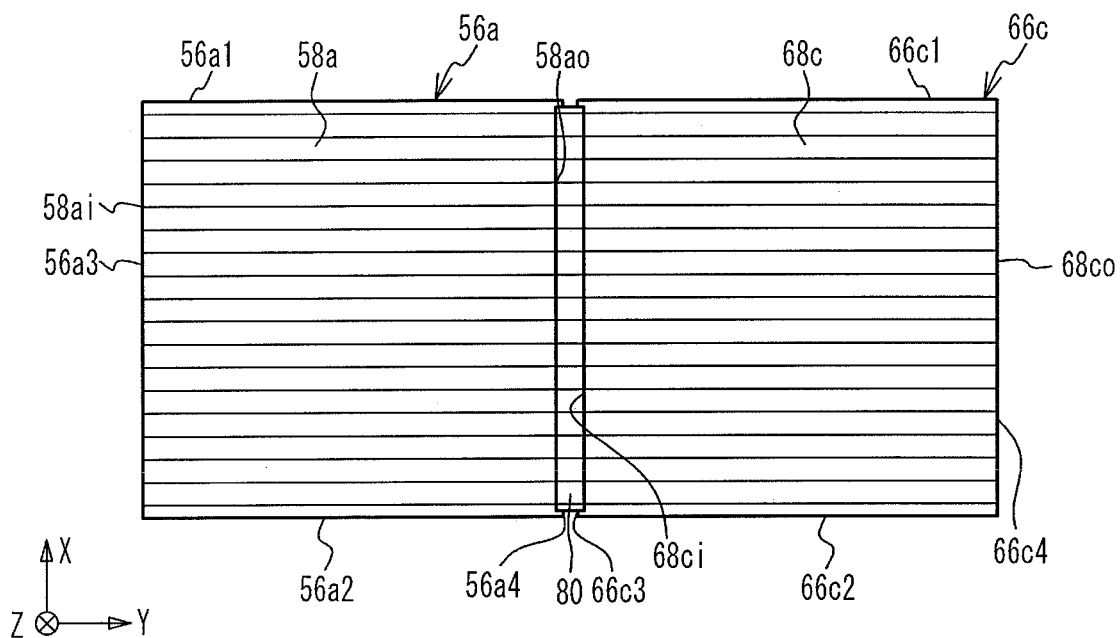
FIG. 6A is a view illustrating coolant flow grooves when an anode separator and a cathode separator are viewed in the −Z direction.

FIG. 6A is a view illustrating coolant flow grooves 58a and 68c when the anode separator 56a and the cathode separator 66c are viewed in the −Z direction. The anode separator 56a includes edges 56a1 to 56a4. The edges 56a1 to 56a4 correspond to the side surfaces 511 to 514 illustrated in FIG. 2, respectively. Likewise, the cathode separator 66c includes edges 66c1 to 66c4 corresponding to the side surfaces 611 to 614, respectively.

The coolant flow grooves 58a and 68c are formed on respective surfaces, on the +Z direction side, of the anode separator 56a and the cathode separator 66c. The coolant flow grooves 58a and 68c extend substantially linearly in the Y direction. Inlets 58ai and outlets 58ao of the coolant flow grooves 58a are formed to open at the edges 56a3 and 56a4, respectively. Likewise, inlets 68ci and outlets 68co of the coolant flow grooves 68c are formed to open at the edges 66c3 and 66c4, respectively. The coolant flow grooves 58a and 68c have the same size and shape. Since the coolant flow grooves 58a and 68c extend in a substantially linearly, the pressure loss of the coolant flowing through the coolant flow grooves 58a and 68c is suppressed. Thus, the flow velocity of the coolant is ensured, and the unit cells 52 and 62 are cooled efficiently.

The edge 56a4 of the anode separator 56a and the edge 66c3 of the cathode separator 66c are connected through the coolant guide member 80. As for the coolant guide member 80, the longitudinal direction is the X direction, and the thickness in the Z direction is formed to be similar to or slightly larger than that of the anode separator 56a and the like. The coolant guide member 80 prevents the coolant from leaking between the anode separator 56a and the cathode separator 66c to the electrolyte membrane 53 side, and guides the coolant from the coolant flow groove 58a to the coolant flow groove 68c. The coolant guide member 80 is formed with grooves continuous with the coolant flow grooves 58a and 68c, but not limited thereto. Since the coolant guide member 80 has two functions, which guides the coolant from the unit cell 52 to the unit cell 62 and prevents the short circuit between the unit cells 52 and 62, the number of parts is reduced.

Figure 6B:
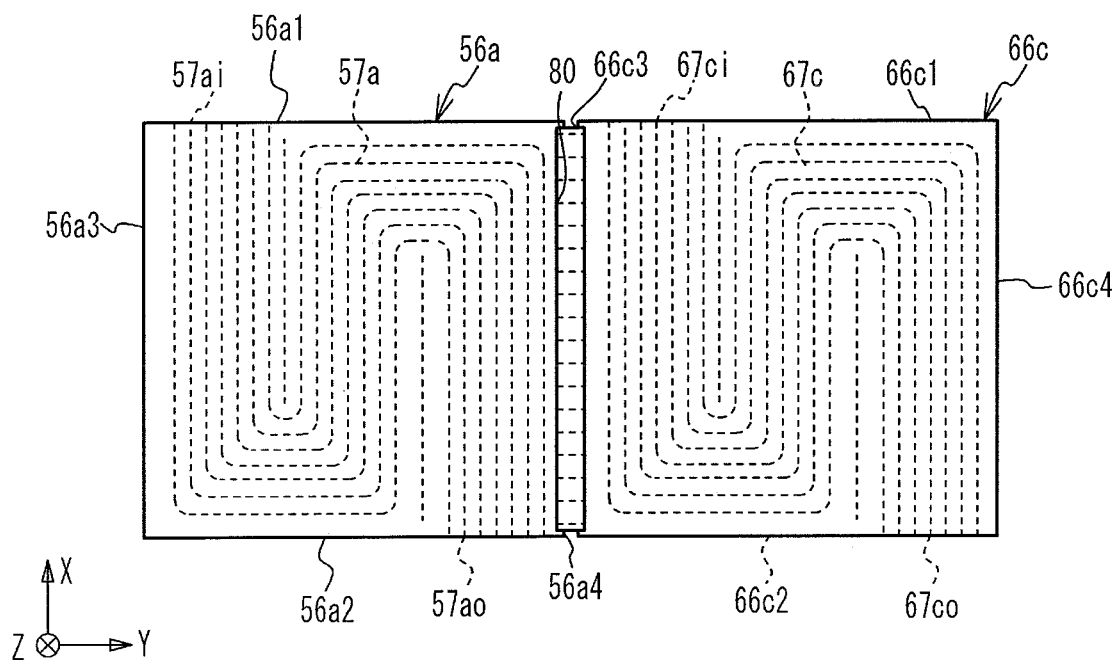
FIG. 6B is a view illustrating anode flow grooves and cathode flow grooves when the anode separator and the cathode separator are viewed in the −Z direction.

FIG. 6B is a view illustrating anode flow grooves 57a and cathode flow grooves 67c when the anode separator 56a and the cathode separator 66c are viewed in the −Z direction. The anode flow groove 57a and the cathode flow groove 67c are formed on respective surfaces, on the −Z direction side, of the anode separator 56a and the cathode separator 66c. The anode flow groove 57a and the cathode flow groove 67c are formed on the back side of the anode separator 56a and the cathode separator 66c, so the anode flow groove 57a and the cathode flow groove 67c are illustrated in FIG. 6B by dotted lines. Further, although the coolant flow grooves 58a and 68c are actually visible on the front side, illustration thereof is omitted in FIG. 6B in order to facilitate understanding of the anode flow grooves 57a and the cathode flow grooves 67c.

Inlets 57ai of the anode flow grooves 57a are formed to open at a position of the edge 56a1 closer to the edge 56a3 than the edge 56a4. Outlets 57ao of the anode flow grooves 57a are formed to open at a position of the edge 56a2 closer to the edge 56a4 than the edge 56a3. The inlets 57ai are formed at a position surrounded by the supply port 122 illustrated in FIG. 4. The outlets 57ao are formed at a position surrounded by the guide inlet 241. The anode flow grooves 57a extend from the inlets 57ai in the −X direction, curve around the edge 56a2 and extend in the +X direction, and curve around the edge 56a1 and extend to the edge 56a2 in the −X direction. The shape of the anode flow grooves 57a are so-called serpentine shape.

The cathode flow grooves 67c also have the same serpentine shape as the anode flow grooves 57a. Inlets 67ci and outlets 67co of the cathode flow grooves 67c are formed at the edges 66c1 and 66c2, respectively. The inlets 67ci and the outlets 67co are respectively surrounded by the guide outlet 142 and the discharge outlet 161 illustrated in FIG. 4. As described above, the anode separator 56a and the cathode separator 66c have the same shape and size. Common parts are used in this manner, thereby suppressing an increase in manufacturing cost.

[Detailed Configuration of Cathode Separator 56c and Anode Separator 66a]

Figure 7A:
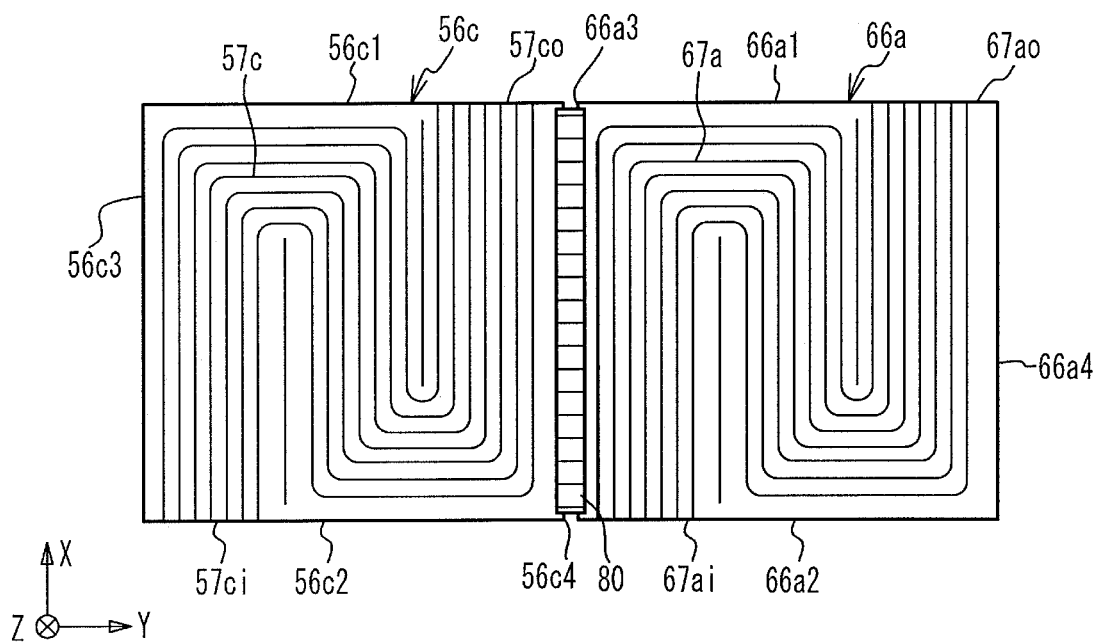
FIG. 7A is a view illustrating cathode flow grooves and anode flow grooves when a cathode separator and an anode separator are viewed in the −Z direction.

FIG. 7A is a view illustrating cathode flow grooves 57c and anode flow grooves 67a when the cathode separator 56c and the anode separator 66a are viewed in the −Z direction. The cathode separator 56c includes edges 56c1 to 56c4 respectively corresponding to the side surfaces 511 to 514 illustrated in FIG. 2. Likewise, the anode separator 66a includes edges 66a1 to 66a4 respectively corresponding to the side surfaces 611 to 614 illustrated in FIG. 1.

The cathode flow grooves 57c and the anode flow grooves 67a are formed on respective surfaces, on the +Z direction side, of the cathode separator 56c and the anode separator 66a. Each shape of the cathode flow grooves 57c and the anode flow grooves 67a is also serpentine. Inlets 57ci and outlets 57co of the cathode flow grooves 57c are formed to open at the edges 56c2 and 56c1, respectively. Inlets 67ai and outlets 67ao of the anode flow grooves 67a are formed to open at the edges 66a2 and 66a1, respectively. The inlets 57ci and the outlets 57co are respectively surrounded by the supply port 222 and the guide inlet 141 illustrated in FIG. 4. The inlets 67ai and the outlets 67ao are respectively surrounded by the guide outlet 242 and the discharge outlet 161 illustrated in FIG. 4.

Figure 7B:
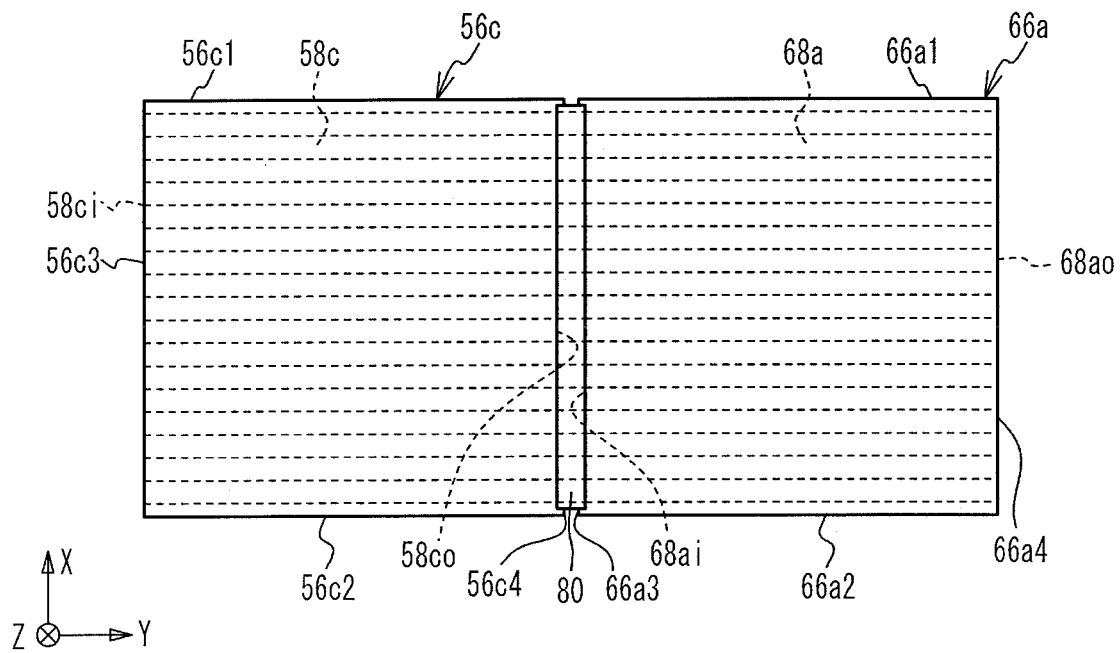
FIG. 7B is a view illustrating coolant flow grooves when the cathode separator and the anode separator are viewed in the −Z direction.

FIG. 7B is a view illustrating coolant flow grooves 58c and 68a when the cathode separator 56c and the anode separator 66a are viewed in the −Z direction. In FIG. 7B, the cathode flow grooves 57c and the anode flow grooves 67a are originally visible in the front side. However, in order to facilitate the understanding of the coolant flow grooves 58c and 68a, the illustration of the cathode flow groove 57c and the anode flow groove 67a is omitted.

Inlets 58ci and outlets 58co of the coolant flow grooves 58c are formed at the edges 56c3 and 56c4, respectively. Inlets 68ai and outlets 68ao of the coolant flow grooves 68a are formed at the edges 66a3 and 66a4, respectively. The edges 56c4 and 66a3 are connected through the coolant guide member 80, and the coolant is guided from the coolant flow grooves 58c to the coolant flow grooves 68a while suppressing the coolant from leaking toward the electrolyte membrane 53. Herein, the coolant flow grooves 58c and 68a also extend linearly, thereby suppressing an increase in pressure loss of the coolant. Further, the cathode separator 56c and the anode separator 66a have the same shape and size, so that an increase in manufacturing cost is suppressed.

As illustrated in FIGS. 6A and 7B, the coolant flow grooves 58a, 58c, 68a, and 68c have the same shape. Further, when the anode flow grooves 57a and the cathode flow grooves 67c illustrated in FIG. 6B are reversed front and back, the anode flow grooves 57a and the cathode flow grooves 67c are the same in shape as the cathode flow groove 57c and the anode flow groove 67a illustrated in FIG. 7A. That is, the anode separator 56a, the cathode separator 56c, the anode separator 66a, and the cathode separator 66c have the same shape and size. Therefore, more common parts are used, thereby suppressing an increase in manufacturing cost.

Further, as illustrated in FIGS. 1, 2, 6A, and 7B, the coolant is supplied to the stack 50 in the +Y direction and flows through the stacks 50 and 60 in the +Y direction. In this manner, the coolant flows through the fuel cell stack 1. This suppresses an increase in pressure loss of the coolant due to the flow of the coolant through the fuel cell stack 1, so that even a low power pump for supplying the coolant to the fuel cell stack 1 is available thereto. Further, the coolant is supplied substantially simultaneously from the supply portion 32 of the manifold 30 to the inlets 58ai and 58ci of all the coolant flow grooves 58a and 58c, thereby suppressing the variation in the temperature distribution for each unit cell 52. This improves the power generation efficiency of the stack 50.

As illustrated in FIGS. 6A and 7B, all the coolant flow grooves 58a, 58c, 68a, and 68c extend in a substantially linear manner, but are not limited thereto. For example, when the inlets 58*ai* and the outlets 58*ao* of the coolant flow grooves 58*a* have only to be formed at the edges 56*a*3 and 56*a*4, respectively, and when the coolant flow grooves 58*a* have only to extend along the +Y direction, even if at least a part may be waved, curved, or inclined with respect to the +Y direction. The same applies to the other coolant flow grooves 58*c*, 68*a* and 68*c*.

[Function of Supply Portion 22]

Figure 8:
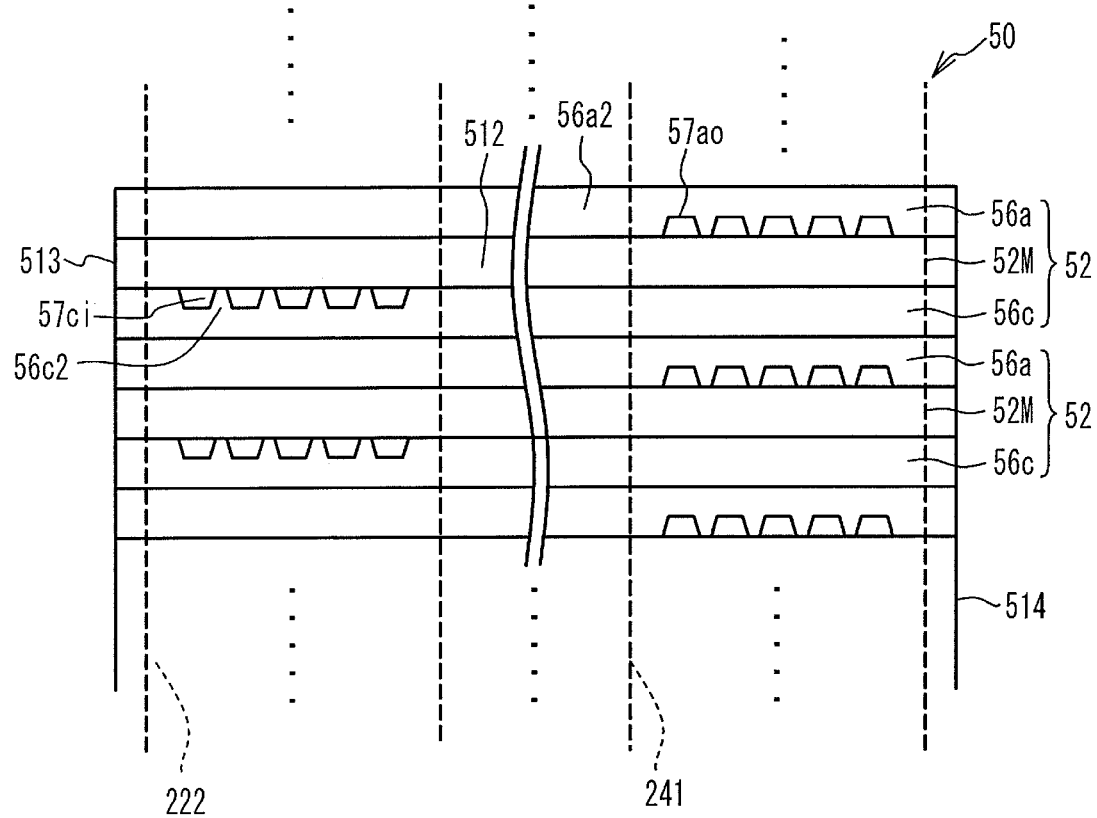
FIG. 8 is a view illustrating a part of a side surface of the stack.

FIG. 8 is a view illustrating a part of the side surface 512 of the stack 50. In order to facilitate the understanding, FIG. 8 illustrates the electrolyte membrane 53, the anode catalyst layer 54*a*, the cathode catalyst layer 54*c*, the anode diffusion layer 55*a*, and the cathode diffusion layer 55*c* of each unit cell 52 as the Membrane Electrode Gas diffusion layer Assembly (MEGA) 52M. In FIG. 8, the supply port 222 of the supply portion 22 and the guide inlet 241 of the guide portion 24 are illustrated by broken lines. As described above, the inlets 57*ci* of the cathode flow grooves 57*c* of all the unit cells 52 are surrounded by the supply port 222. In other words, the cross-sectional area of the supply port 222 is larger than the sum of the cross-sectional areas of all the inlets 57*ci*. Thus, the pressure of the cathode gas supplied to each cathode flow groove 57*c* is made substantially even, so that the flow rate of the cathode gas for each cathode flow groove 57*c* is made substantially even. It is thus possible to suppress the deviation of the power generation distribution in the unit cell 52, and to improve the power generation efficiency of the stack 50.

[Function of Guide Portion 24]

Further, the outlets 57*ao* of the anode flow grooves 57*a* of all the unit cells 52 are surrounded by the guide inlet 241, and the cross-sectional area of the guide inlet 241 of the guide portion 24 is larger than the sum of the cross-sectional areas of all the outlets 57*ao*. Likewise, although not illustrated in FIG. 8, the cross-sectional area of the guide outlet 242 is larger than the sum of the cross-sectional areas of the inlets 67*ai* of the unit cell 62. Therefore, the guide portion 24 causes the anode gas discharged from the outlets 57*ao* of all the unit cells 52 to flow into one another, and to be supplied to the inlets 67*ai* of the unit cells 62. Therefore, the pressure of the anode gas discharged from the stack 50 is made substantially even in each anode flow groove 67*a*, and the flow rate of the anode gas is made substantially even in each anode flow groove 67*a*. This improves the power generation efficiency of the stack 60.

Herein, the anode gas discharged from the outlets 57*ao* of the anode flow groove 57*a* of the unit cells 52 are depressurized in the guide portion 24. This is because the volume of the guide portion 24 is larger than the sum of the volumes of all the anode flow grooves 57*a*. For this reason, for example, liquid water discharged from the outlet 57*ao* into the guide portion 24 is depressurized therein, so that the liquid water is promoted to be water vapor therein. It is thus possible to supply the anode gas containing the water vapor to the stack 60, and to ensure the wet state of the unit cells 62. This improves the power generation efficiency of the stack 60.

[Functions of Supply Portion 12 and Guide Portion 14]

Likewise, the cross-sectional area of the supply port 122 of the supply portion 12 is larger than the sum of the cross-sectional areas of the inlets 57*ai* of the anode flow grooves 57*a* of all the unit cells 52. Thus, the flow rate of the anode gas is made substantially even in each anode flow groove 57*a*, thereby improving the power generation efficiency of the stack 50. Additionally, the cross-sectional area of the guide inlet 141 is larger than the sum of the cross-sectional areas of the outlets 57*co* of the cathode flow grooves 57*c* of all the unit cells 52, and the cross-sectional area of the guide outlet 142 is larger than the sum of the inlets 67*ci* of the cathode flow grooves 67*c* of all the unit cells 62. Thus, the guide portion 14 causes the cathode gas discharged from the outlets 57*co* of the cathode flow grooves 57*c* of all the unit cells 52 to flow into one another, and to be supplied to the inlets 67*ci* of all the unit cells 62. Therefore, the pressure of the cathode gas discharged from the stack 50 is made even and supplied to the stack 60, thereby improving the power generation efficiency of the stack 60.

The cathode gas discharged from the outlets 57*co* of the cathode flow grooves 57*c* is depressurized in the guide portion 14. Therefore, liquid water discharged from the outlet 57*co* of the cathode flow groove 57*c* is promoted to be water vapor in the guide portion 14, thereby improving the power generation efficiency of the stack 60. Moreover, the liquid water might be stored in the guide portions 14 and 24, so that, for example, a discharge valve or the like for discharging the liquid water from the guide portions 14 and 24 may be provided therein.

In the above embodiment, the stacking direction of the unit cells 52 and the stacking direction of the unit cells 62 are the same as the Z direction, but they do not need to completely coincide with each other. For example, the unit cells 62 may be stacked along the stacking direction of the unit cells 52 in consideration of dimensional errors and the like occurring in manufacturing. In the above embodiment, the unit cells 52 and 62 have the same shape and size, but are not limited thereto. The electrolyte membrane 53 is shared by the unit cells 52 and 62 in the above embodiment, but not limited thereto, and the electrolyte membranes individually separated from each other may be used. Further, the number of the unit cells 52 is the same as the number of the unit cells 62, but not limited thereto. For example, when the number of the unit cells 52 is larger than the number of the unit cells 62, and the stack 50 is higher than the stack 60 in the stacking direction, in order to absorb the difference in height, for example, the terminal plate 93 connected to the stack 60 may be thicker than the terminal plate 91 connected to the stack 50. In the above embodiment, the manifolds 10, 20, and 30 extend along the Y direction, whereby the fuel cell stack 1 reduces its size in the X direction, but not limited thereto. For example, at least one of the supply portions 12 and 22 or the discharge portions 16 and 26 of the manifolds 10 and 20 may extend along the X direction. Even in this case, the fuel cell stack 1 reduces its size in the Z direction. At least one of the flowing directions of the anode gas, the cathode gas, and the coolant may be reversed.

[First Variation]

Figure 9A:
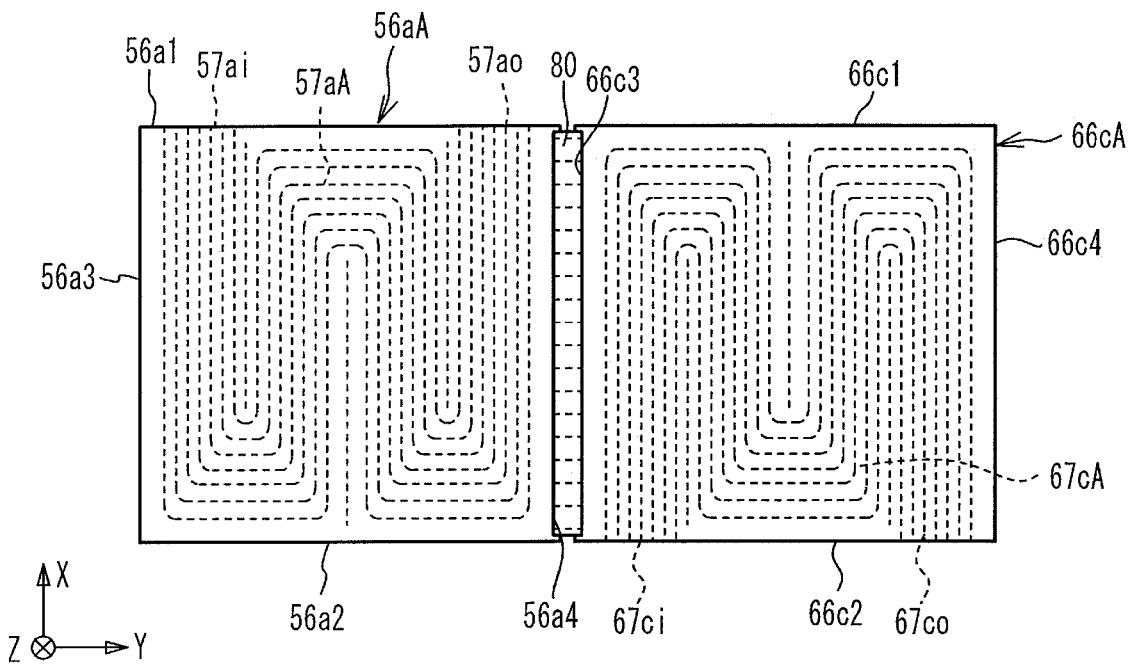
FIG. 9A is an explanatory view of an anode separator and a cathode separator in a first variation.
Figure 9B:
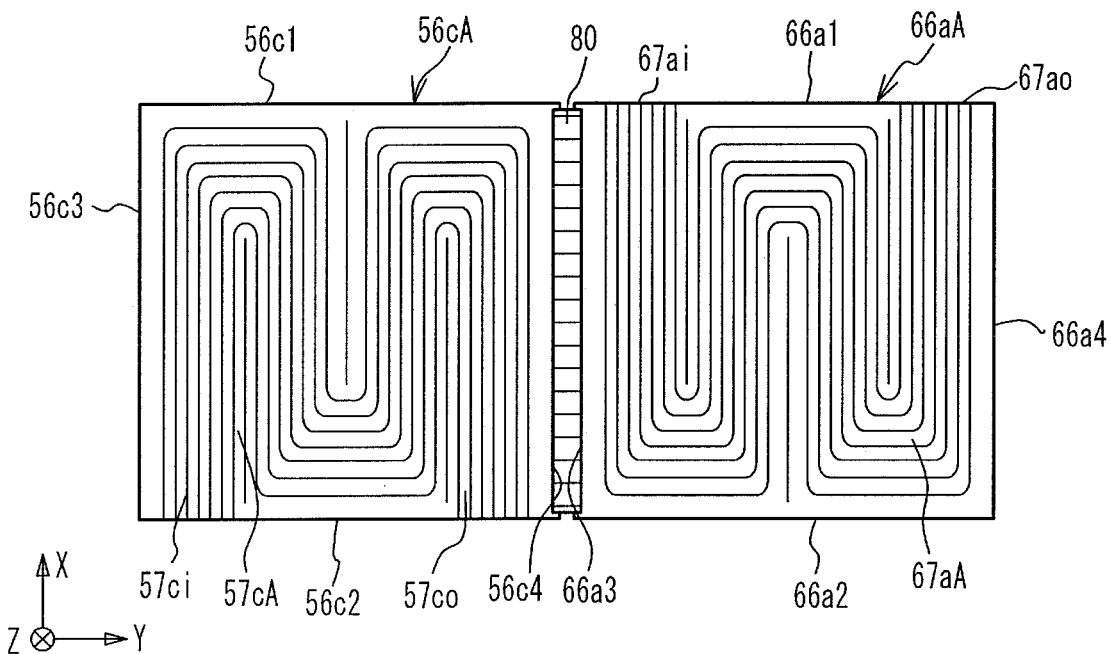
FIG. 9B is an explanatory view of a cathode separator and an anode separator in the first variation.

Next, variations will be described. Additionally, the same reference numerals denote the same components, and the duplicated explanation is omitted. FIG. 9A is an explanatory view of an anode separator 56*a*A and a cathode separator 66*c*A in a first variation. FIG. 9B is an explanatory view of a cathode separator 56*c*A and an anode separator 66*a*A in the first variation. FIGS. 9A and 9B respectively correspond to FIGS. 6B and 7A. Both the inlets 57*ai* and the outlets 57*ao* of anode flow grooves 57*a*A are formed at the edge 56*a*1. Both the inlets 67*ci* and the outlets 67*co* of cathode flow grooves 67*c*A are formed at the edge 66*c*2. Both the inlets 57*ci* and the outlets 57*co* of cathode flow grooves 57*c*A are formed at the edge 56*c*2. Both the inlets 67*ai* and the outlets 67*ao* of anode flow grooves 67*a*A are formed at the edge 66*a*1.

Therefore, in the first variation unlike the embodiment described above, the anode gas flows from the supply portion 12 through the anode flow grooves 57aA to the guide portion 14, and flows from the guide portion 14 through the anode flow grooves 67aA to the discharge portion 16. The cathode gas flows from the supply portion 22 through the cathode flow groove 57cA to the guide portion 24, and flows from the guide portion 24 through the cathode flow groove 67cA to the discharge portion 26. Also in such a configuration, the anode gas discharged from the anode flow grooves 57aA flows into one another in the guide portion 14, and is uniformly supplied to the anode flow grooves 67aA. Further, depressurization of the anode gas discharged from the anode flow grooves 57aA in the guide portion 14 promotes vaporization of the liquid water discharged from the anode flow groove 57aA to the guide portion 14, so that the anode gas in a good wet state is supplied to the anode flow grooves 67aA. Likewise, the cathode gas discharged from the cathode flow grooves 57cA flows into one another in the guide portion 24, and is uniformly supplied to the cathode flow grooves 67cA. Further, depressurization of the cathode gas discharged from the cathode flow groove 57cA in the guide portion 24 promotes vaporization of the liquid water discharged from the cathode flow grooves 57cA to the guide portion 24, so that the cathode gas in a good wet state is supplied to the cathode flow grooves 67cA.

As described above, it is possible to facilitate varying the paths in which the anode gas and the cathode gas flow by using the separators having different shapes of flow grooves for the reactant gas. Further, separators may be formed with flow grooves of reactant gases such that the anode gas flows to the supply portion 12, the stack 50, the guide portion 14, the stack 60, and the discharge portion 26 described above in this order, and that the cathode gas flows to the supply portion 22, the stack 50, the guide portion 24, the stack 60, and the discharge portion 16 in this order.

Furthermore, the anode gas may flow to the supply portion 12, the stack 50, the guide portion 24, the stack 60, and the discharge portion 26 in this order. The cathode gas may flow to the supply portion 22, the stack 50, the guide portion 14, the stack 60, and the discharge portion 16. Furthermore, in the above-described variation, at least one of the flow directions of the anode gas, the cathode gas, and the coolant may be reversed.

[Second Variation]

Figure 10:
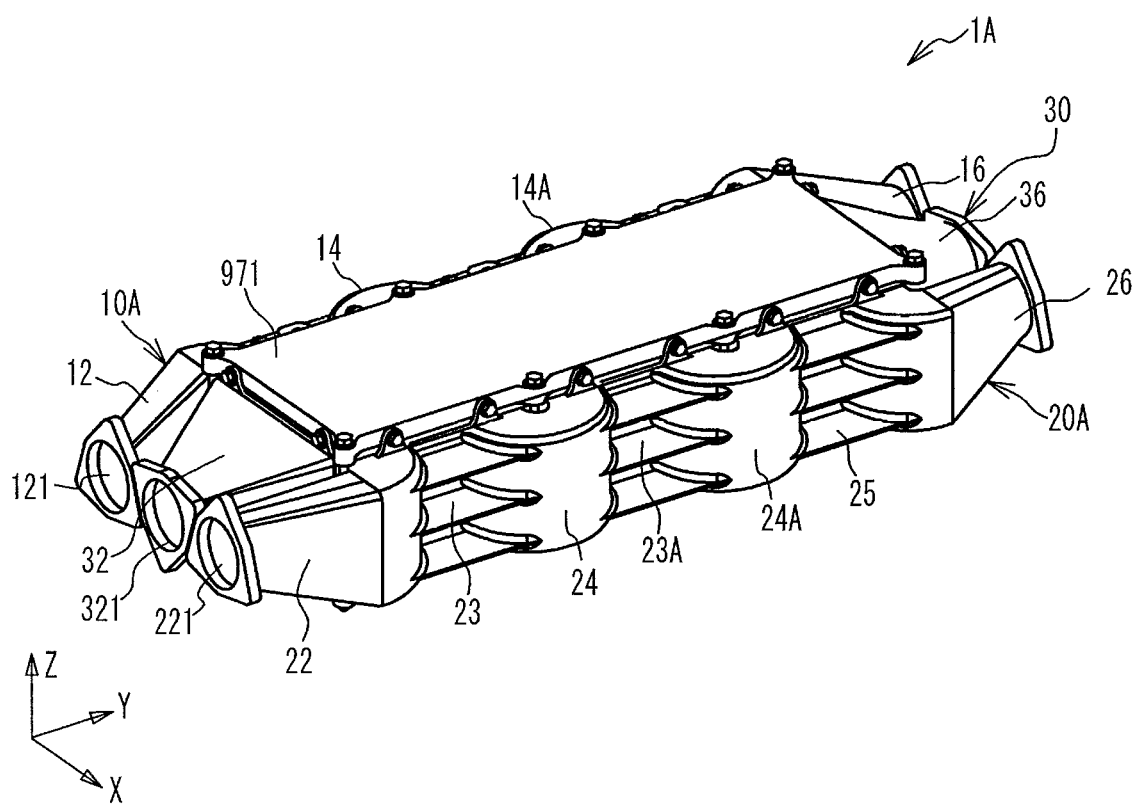
FIG. 10 is an external perspective view of a fuel cell stack according to a second variation.

FIG. 10 is an external perspective view of a fuel cell stack 1A according to a second variation. The fuel cell stack 1A is longer than the fuel cell stack 1 described above in the Y direction. Further, in a manifold 10A, a guide portion 14A is formed between the guide portion 14 and the discharge portion 16. In a manifold 20A, a guide portion 24A is formed between the guide portion 24 and the discharge portion 26. The guide portions 14A and 24A are the same in shape and size as the guide portions 14 and 24, respectively. In the fuel cell stack 1A, a stack 70 in addition to the stacks 50 and 60 are arranged in parallel in the Y direction, which will be described later. The discharge portion 36 of the manifold 30 is connected to the stack 70, and the stack 60 is sandwiched by the supply portion 32 and the discharge portion 36 via the stacks 50 and 70 in the Y direction.

The anode gas flows to the supply portion 12, the stack 50, the guide portion 24, the stack 60, the guide portion 14A, the stack 70 described later, and the discharge portion 26 in this order. The cathode gas flows to the supply portion 22, the stack 50, the guide portion 14, the stack 60, the guide portion 24A, the stack 70, and the discharge portion 16 in this order. The coolant flows to the supply portion 32, the stacks 50, 60, and 70, and the discharge portion 36 in this order. Heat transfer fins 23A are provided between the guide portions 24 and 24A. Likewise, heat transfer fins, not illustrated in FIG. 10, are provided between the guide portions 14 and 14A.

Also, as for the fuel cell stack 1A according to the second variation, the manifolds 10A and 20A extend along the Y direction in the above manner, whereby the fuel cell stack 1A reduces its size in the Z direction and the X direction, like the fuel cell stack 1 according to the present embodiment described above.

Figure 11:
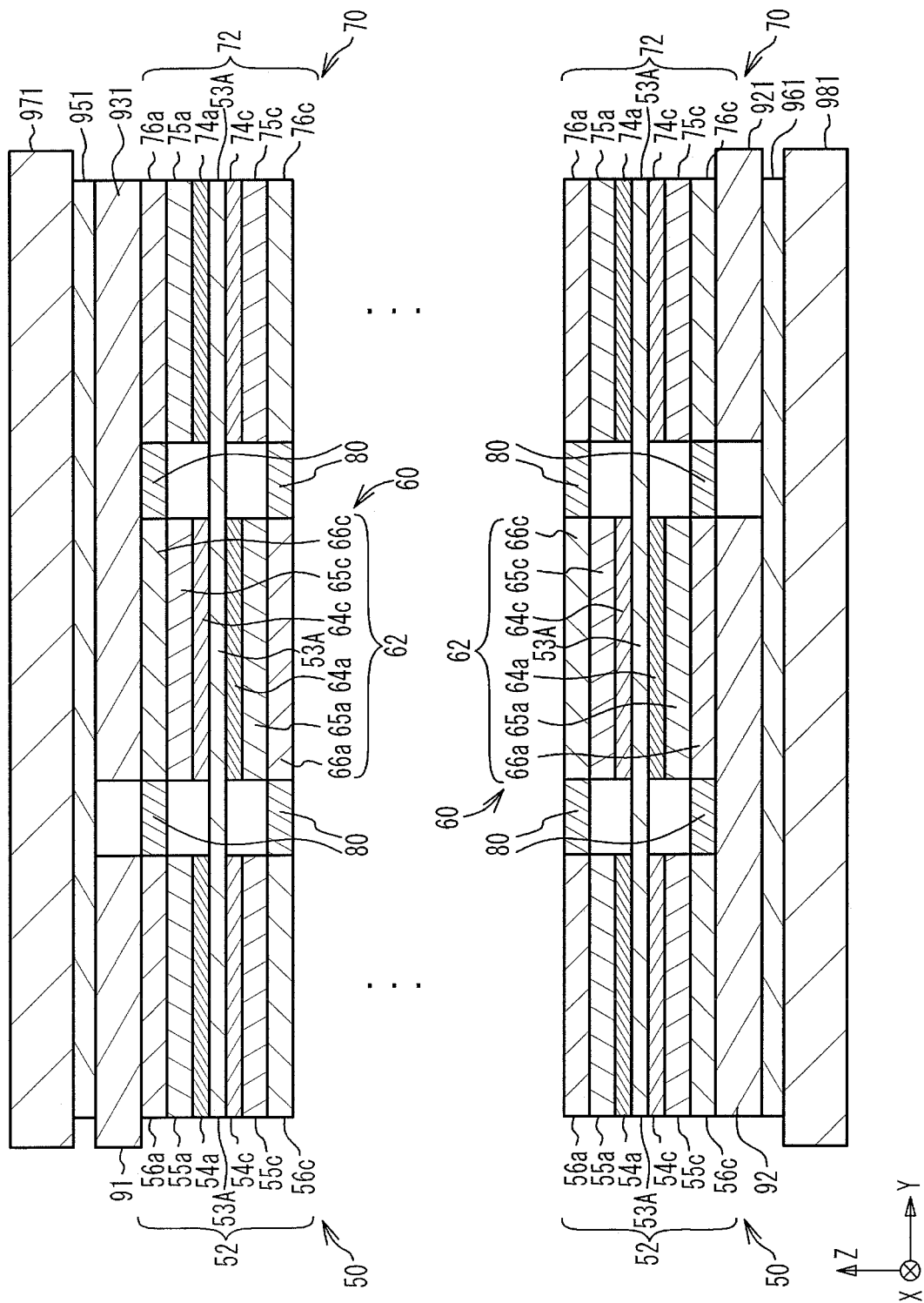
FIG. 11 is a cross-sectional view of stacks of a fuel cell stack according to a second variation.

FIG. 11 is a cross-sectional view of the stacks 50, 60 and 70 of the fuel cell stack 1A according to the second variation. In the second variation, in addition to the stacks 50 and 60, the stack 70 juxtaposed to the stack 60 in the +Y direction is provided. The stack 70 is composed of stacked unit cells 72. The unit cell 72 includes an electrolyte membrane 53A, an anode catalyst layer 74a, an anode diffusion layer 75a, an anode separator 76a, a cathode catalyst layer 74c, a cathode diffusion layer 75c, and a cathode separator 76c. In the second variation, the electrolyte membrane 53A is shared by the unit cells 52, 62, and 72. The electrolyte membrane 53A has a substantially rectangular shape. A longitudinal length of the electrolyte membrane 53A is substantially the same as the total length of the lengths of the unit cells 52, 62, and 72 in the Y direction and the lengths of the two coolant guide members 80 in the Y direction. A short length of the electrolyte membrane 53A is substantially the same as each length of the unit cells 52, 62, and 72 in X direction. The same applies to end plates 971 and 981 that sandwich the stacks 50, 60, and 70 in the Z direction, and to insulators 951 and 961 that sandwich the stacks 50, 60, and 70 in the Z direction. The insulator 951 is disposed between the terminal plate 91 and an intermediate plate 931, and the end plate 971. The insulator 961 is disposed between an intermediate plate 92 and a terminal plate 921, and the end plate 981.

The anode catalyst layer 74a, the anode diffusion layer 75a, the anode separator 76a, the cathode catalyst layer 74c, the cathode diffusion layer 75c, and the cathode separator 76c of the unit cell 72 are respectively adjacent to the cathode catalyst layer 64c, the cathode diffusion layer 65c, the cathode separator 66c, the anode catalyst layer 64a, the anode diffusion layer 65a, and the anode separator 66a of the unit cell 62 in the Y direction. Further, the anode separator 76a and the cathode separator 66c adjacent to each other in the Y direction are connected through the coolant guide member 80. The cathode separator 76c and the anode separator 66a adjacent to each other in the Y direction are also connected through the coolant guide member 80.

The intermediate plate 931 is conductively connected to the cathode separator 66c of the unit cell 62, disposed at the end of the stack 60 in the +Z direction, and the anode separator 76a of the unit cell 72, disposed at the end of the stack 70 in the +Z direction. The intermediate plate 931 is spaced apart from the terminal plate 91. Further, the terminal plate 921 is conductively connected to the cathode separator 76c of the unit cell 72 disposed at the end of the stack 70 in the −Z direction. The terminal plate 921 is spaced away from the intermediate plate 92.

The unit cells 52 are connected in series between the terminal plate 91 and the intermediate plate 92. The unit cells 62 are connected in series between the intermediate plates 92 and 931. The unit cells 72 are connected in series between the intermediate plate 931 and the terminal plate 921. Therefore, the total number of the unit cells 52, 62, and 72 is ensured, and the total output voltage of the stacks 50, 60, and 70 is ensured. In this manner, the fuel cell stack 1A ensures the output power and reduces its size in the Z direction. Further, the electrolyte membrane 53A of the unit cell 72 is also shared by the unit cells 52 and 62, thereby suppressing an increase in manufacturing cost.

Also, in the second variation, at least one of the flow directions of the cathode gas, the anode gas, and the coolant may be reversed. In the second variation, the unit cells 52, 62 and 72 have the same shape and size, but not limited thereto. In the second variation, the electrolyte membrane 53A is shared by the unit cells 52, 62, and 72, but not limited thereto, and electrolyte membranes individually separated from each other may be used. For example, an electrolyte membrane may be shared by the unit cells 52 and 62 adjacent to each other, and an electrolyte membrane of the unit cell 72 may not be shared by the unit cells 52 and 62. An electrolyte membrane may be shared by the unit cells 62 and 72 adjacent to each other, and an electrolyte membrane of the unit cell 52 may not be shared by the unit cells 62 and 72. Further, each number of the unit cells 52, 62, and 72 is the same, but not limited thereto. For example, each number of the unit cells 52 and 62 may be the same, the number of the unit cells 72 may be larger than each number of the unit cells 52 and 62, and the stack 70 may be higher than each of the stacks 50 and 60 in the stacking direction. In this case, for example, the intermediate plate 92 connected to the stacks 50 and 60 may be thicker than the terinal plate 921 connected to the stack 70 so as to absorb the difference in height.

Although some embodiments of the present disclosure have been described in detail, the present disclosure is not limited to the specific embodiments but may be varied or changed within the scope of the present disclosure as claimed.

The invention claimed is:

1. A fuel cell stack comprising:
a first stack including:
first unit cells stacked; and
a first outer peripheral surface around a first stacking direction Z of the first unit cells;
a second stack that is juxtaposed to the first stack in a Y direction perpendicular to the first stacking direction Z, the second stack including:
second unit cells stacked parallel to the first stacking direction Z of the first unit cells; and
a second outer peripheral surface around the second unit cells;
an external gas manifold that supplies and discharges a reactant gas to and from the first and second stacks, wherein the external gas manifold includes first and second external gas manifolds that sandwich the first and second stacks in-between the first and second external gas manifolds in an X direction perpendicular to the Y and Z directions; and
an external coolant manifold that supplies and discharges a coolant to and from the first and second stacks,
wherein the first and second external gas manifolds are connected to at least a part of the first outer peripheral surface and at least a part of the second outer peripheral surface, and extend along the Y direction,
wherein each of the first and second external gas manifolds includes a supply port, with the supply ports of the first and second external gas manifolds facing each other in the X direction on opposite sides of the first and second stacks and being configured to supply the reactant gas to the first and second stacks, wherein each of the supply ports has a cross-sectional area that is larger than one of a sum of cross-sectional areas of all inlets of reactant gas flow grooves for the reactant gas defined in all of the first unit cells or a sum of cross-sectional areas of all inlets of reactant gas flow grooves for the reactant gas defined in all of the second unit cells, and
the external coolant manifold includes:
a coolant supply portion that supplies the coolant to one of the first and second stacks; and
a coolant discharge portion that discharges the coolant from the other of the first and second stacks, and
the coolant supply portion and the coolant discharge portion sandwich the first and second stacks in the Y direction in which the first and second stacks are juxtaposed to each other,
wherein the reactant gas includes an anode gas and a cathode gas,
each of the first and second external gas manifolds is a unitary member that includes an anode gas passage portion and a cathode gas passage portion separated from each other and through which the anode gas and the cathode gas flow, respectively, and
the cathode gas passage portion of the first external gas manifold is a reactant gas guide portion that guides the cathode gas discharged from one of the first and second stacks to the other of the first and second stacks.

2. The fuel cell stack of claim 1, wherein
the first and second outer peripheral surfaces respectively include first and second facing regions that face each other,
the external gas manifold and the external coolant manifold are connected to at least other regions of the first and second outer peripheral surfaces other than the first and second facing regions,
the fuel cell stack includes a coolant guide member, and
the coolant guide member electrically insulates the first and second facing regions from each other, connects the first and second facing regions to each other, and guides the coolant discharged from one of the first and second stacks to the other of the first and second stacks.

3. The fuel cell stack of claim 1, wherein
the first and second stacks respectively include first and second coolant flow grooves through which the coolant flows, and
the first and second coolant flow grooves extend in the Y direction in which the first and second stacks are juxtaposed to each other.

4. The fuel cell stack of claim 1, wherein the reactant gas guide portion guides the reactant gas discharged from outlets of the reactant gas flow grooves provided in the one of the first and second stacks into inlets of the reactant gas flow grooves provided in the other of the first and second stacks.

5. The fuel cell stack of claim 1, wherein
the anode gas passage portion supplies the anode gas to one of the first and second stacks located on an upstream side of the anode gas,
each of the external gas manifolds includes a heat transfer portion, and
the heat transfer portion promotes heat exchange between the anode gas flowing through the anode gas passage portion and the cathode gas flowing through the cathode gas passage portion.

6. The fuel cell stack of claim 1, wherein
the cathode gas passage portion supplies the cathode gas to one of the first and second stacks located on an upstream side of the cathode gas,
each of the external gas manifolds includes a heat transfer portion, and the heat transfer portion promotes heat exchange between the cathode gas flowing through the cathode gas passage portion and the anode gas flowing through the anode gas passage portion.

7. The fuel cell stack of claim 1, wherein the first and second unit cells, adjacent to each other in the Y direction in which the first and second stacks are juxtaposed to each other, include a common electrolyte membrane.

8. The fuel cell stack of claim 7, wherein
the first unit cell includes a first anode catalyst layer and a first cathode catalyst layer,
the second unit cell includes a second anode catalyst layer and a second cathode catalyst layer,
the first anode catalyst layer and the second cathode catalyst layer are spaced apart from each other, and are provided on one surface of the common electrolyte membrane, and
the second anode catalyst layer and the first cathode catalyst layer are spaced apart from each other, and are provided on the other surface of the common electrolyte membrane.

* * * * *